C. B. DOOLIN.
LAMINATED FABRIC FOR TIRE CASINGS.
APPLICATION FILED JAN. 16, 1918.
1,311,857.
Patented July 29, 1919.
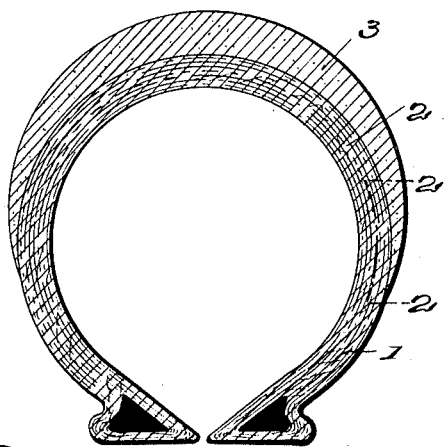
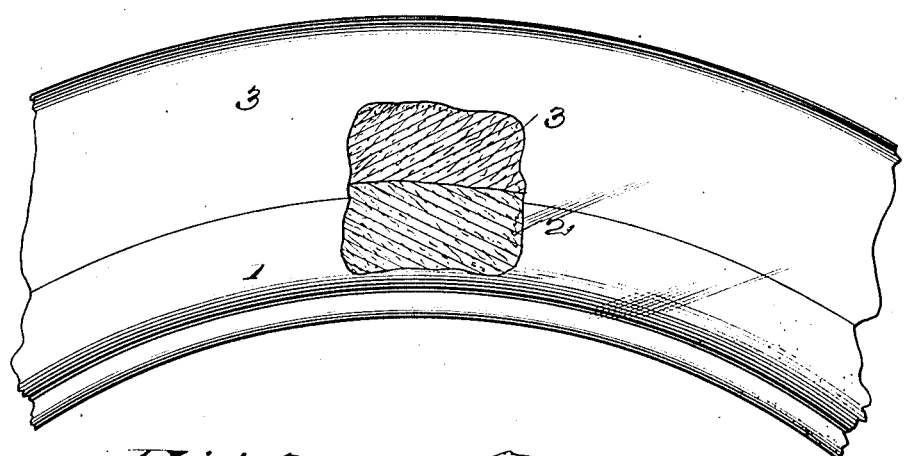
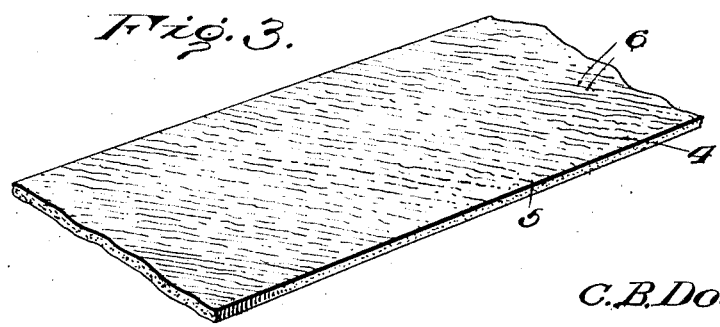
Inventor
C. B. Doolin.
By
Attorneys

UNITED STATES PATENT OFFICE.

CHARLES B. DOOLIN, OF SAN ANTONIO, TEXAS.

LAMINATED FABRIC FOR TIRE-CASINGS.

1,311,857.      Specification of Letters Patent.     Patented July 29, 1919

Application filed January 16, 1918. Serial No. 212,027.

*To all whom it may concern:*

Be it known that I, CHARLES BARNARD DOOLIN, a citizen of the United States, residing at San Antonio, in the county of Bexar and State of Texas, have invented certain new and useful Improvements in Laminated Fabrics for Tire-Casings, of which the following is a specification.

This invention relates to improvements in pneumatic tire casings and has as its object to provide a casing which will be more durable than the ordinary laminated fabric consisting of rubber or a composition of rubber and fabric, which will not be as liable to become heated as the ordinary casing, and will not be as likely to be torn or pulled apart as a casing consisting of rubber and plies of fabric.

A further aim of the invention is to provide material for a tire casing so constructed that the same will possess great strength in all directions so as to effectually resist blowouts even when the casing becomes considerably worn.

The invention also contemplates a novel method of building up a tire casing.

In the accompanying drawings:

Figure 1 is a vertical transverse sectional view through the tire casing embodying the present invention;

Fig. 2 is a sectional view on the line 2—2 of Fig. 1, a portion of the casing being shown in side elevation;

Fig. 3 is a perspective view of a portion of one of the lamina employed in building-up the fabric.

In the drawings the tire casing embodying the invention is indicated in general by the numeral 1 and the body of this casing, indicated by the numeral 2 is of laminated structure throughout and may be provided with a rubber tread 3 or may in itself be designed to directly contact the road surface. In the manufacture of the body, soft rubber and a loose fibrous material, such for example as asbestos, are intimately mixed and rolled into a thin sheet or strip of suitable width and length, as shown in Fig. 3 of the drawings. This sheet may be made at first in its final width, or it may be made wide and then cut in strips whereof each is indicated in general by the numeral 4, and the numerals 5 and 6 indicate, respectively, the rubber and fibrous constituents of the layer. As stated the fibrous material employed is in a loose condition when incorporated in the rubber and it is preferable that the fibers 6 be laid, in one row or more but occupying a plane thinner than the rubber, which latter therefore covers both faces of the fibers. Also these are so arranged that they will extend substantially parallel with each other and in a direction generally diagonal to the length of the strip. Or, the strips may be cut from sheets on the bias to produce the same diagonal disposition of the fibers. When these strips are superposed in the manner contemplated by the invention, the fibers 6 in one strip or layer will be caused to extend approximately at right angles to the fibers in the next adjacent strip or layer of the laminated whole, and thus in the finished product contiguous superposed layers will have their fibers running diagonally in opposite directions so that the casing as a whole will possess the same degree of strength in all directions. After the strips or layers have been prepared and cut to the required size, the desired number thereof are arranged in superposed relation in the manner above stated, and the casing thus formed is then cured by a process of vulcanization so as to permanently unite all of the layers. The composite body thus formed, as illustrated in Fig. 2 of the drawings, becomes a homogeneous laminated structure throughout, with the fibers running diagonally and substantially at right angles to each other in the several laminæ or layers which are united to form the body. Of course, it will be understood that in the process of vulcanization the layers will lose their identity so that a section cut transversely through the body of the casing will reveal an integral solid mass of soft rubber having fibers intimately incorporated therein, as shown in Fig. 1. However, on the other hand a cut made on the line 2—2 of Fig. 1 would disclose the fibers 6 in one lamina at right angles to those in an adjacent lamina of the body.

From the foregoing description it will be understood that the casing body, due to the bias arrangement of the fibers will possess equal strength in all directions and that there can be no heating of the body such as occurs in casings in which the fibrous material is in the nature of distinct sheets or layers instead of being intimately incorporated in the rubber of the casing. I am also aware that tire fabrics have been heretofore produced by employing threads or cords placed side by side or parallel and covered with rubber, but such structure is not claimed by me, my fabric being an intimate mixture of rubber and fiber in which the separate identity of the separate ingredients is destroyed and merged into the product or new article produced by my process. It will also be understood that the casing may become considerably worn without danger of a blow-out and that the fibers render the casing so tough as to practically eliminate likelihood of a puncture.

Having thus described the invention, what is claimed as new is:

A laminated fabric for tire casings and the like whereof each lamina is a strip composed of soft rubber and loose asbestos fibers embedded therein in parallelism with each other but oblique to the length of the strip, the laminæ being vulcanized together with the strips in superposed relation and the fibers in contiguous strips extending in opposite directions.

In testimony whereof I affix my signature.

CHARLES B. DOOLIN. [L. S.]